(12) United States Patent
Iyer et al.

(10) Patent No.: US 7,788,233 B1
(45) Date of Patent: Aug. 31, 2010

(54) DATA STORE REPLICATION FOR ENTITY BASED PARTITION

(75) Inventors: Vidya V. Iyer, Seattle, WA (US); Nicole A. Deflaux, Seattle, WA (US); Adam D. Bradley, Seattle, WA (US); James C. Willeford, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 327 days.

(21) Appl. No.: 11/773,589

(22) Filed: Jul. 5, 2007

(51) Int. Cl.
*G06F 7/00* (2006.01)
(52) U.S. Cl. ...................... 707/661; 711/165
(58) Field of Classification Search .................. 707/661
See application file for complete search history.

(56) References Cited

U.S. PATENT DOCUMENTS

| | | | |
|---|---|---|---|
| 6,330,572 B1 * | 12/2001 | Sitka | 707/205 |
| 7,213,115 B2 * | 5/2007 | Sato et al | 711/162 |
| 2003/0065898 A1 * | 4/2003 | Flamma et al. | 711/165 |
| 2003/0131125 A1 * | 7/2003 | Ooi | 709/237 |
| 2005/0165853 A1 * | 7/2005 | Turpin et al. | 707/200 |

* cited by examiner

*Primary Examiner*—Charles Rones
*Assistant Examiner*—Yuk Ting Choi
(74) *Attorney, Agent, or Firm*—Christensen O'Connor Johnson Kindness PLLC

(57) ABSTRACT

A scalable data store framework is provided to migrate data across partitions in a data store without compromising data availability for customers. The scalable data store framework includes one or more partitions configured to manage a set of "entities" for a network-based service. When a new-partition event is detected, a target partition is identified for bifurcation and various additional partitions are added to the data store. After the target partition is replicated into the additional partitions, some entities associated with the target partition are migrated to the additional partitions in order to maintain good load balance in the data store.

36 Claims, 5 Drawing Sheets

DATA STORE REPLICATION FOR ENTITY BASED PARTITION

BACKGROUND

Generally described, network-based services can maintain information about various customers and/or services provided to customers. As the number of customers and the available services over the networks increase, the amount of customer information maintained in database systems for network-based services can also greatly increase. In some situations, however, the conventional database system resources, such as storage capacity and processing capacity, cannot keep up with the increasing volume of customer information.

One solution may be adding additional database resources, such as computer hardware, as the demand for a higher database capacity arises. However, adding new computer hardware can be expensive and logistically difficult. For example, the addition of additional computer hardware to a database system can require redistribution or migration of data from the existing database hardware to the new database hardware and often deployment of a new software system. Moreover, at some point in the process of the redistribution or migration of data, the existing database and the new database may often be locked from access in order to ensure data consistency. This may disturb various network-based services that require immediate access to information stored in the existing database hardware.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, a scalable data store framework for migrating data across partitions in a data store will be described. As will be described in greater detail below, a data store system in the scalable data store framework includes one or more partitions that are configured to manage a set of "entities" for a network service. A partition is a logically distinct portion of the data store that functions as though it were a physically separate unit. An "entity," as used herein, refers to a collection of information that lives within a single scope of serializability, such as a cluster or a partition. In an illustrative embodiment, information corresponding to an identified customer as an indivisible "entity" can be assigned to a particular partition and all actions associated with the customer are handled by the assigned partition. Alternatively, customer information may correspond to a collection of several entities. Additionally, information regarding a collection of customers may also be an entity.

In an illustrative embodiment, upon a determination of a data migration event, such as a partition that reaches a threshold capacity, entities associated with a target partition are divided into several new partitions. In one aspect, the entities being migrated from the target partition can be distributed to various additional partitions to maintain load-balance among partitions. For example, the distribution to various additional partitions can attempt to ensure that no single prolific customer can monopolize resources, thereby preventing other entities from being served in the same partition. In an illustrative embodiment, entities are migrated from one partition to another partition through data replication of the entire partition, which allows the partition to be accessible during the process of replication and migration.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links. In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

Figure 1:
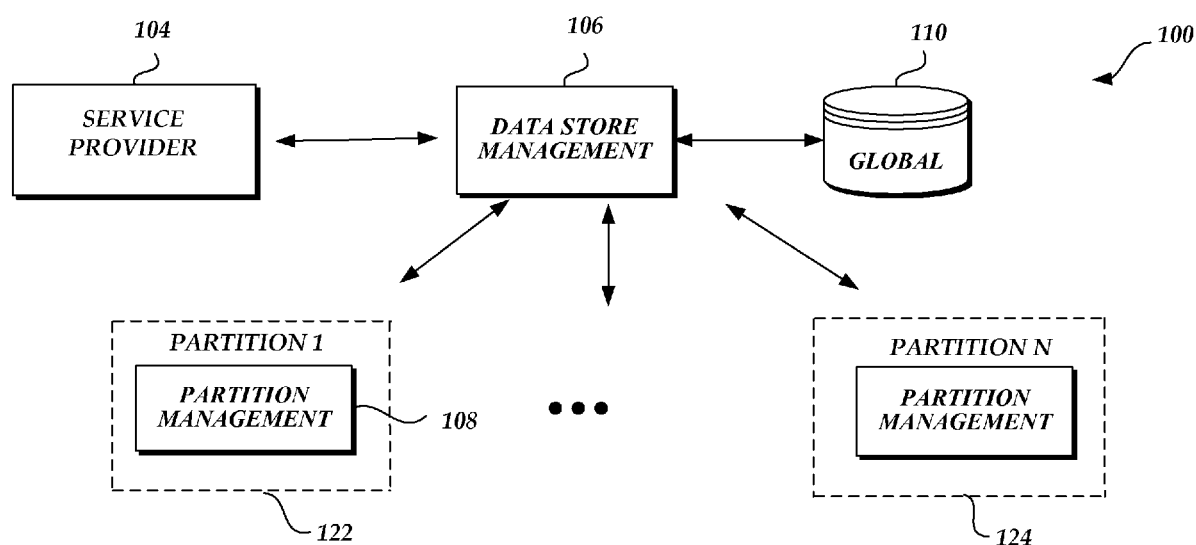
FIG. 1 is a pictorial diagram of an illustrative data store system utilizing scalable data store framework, in accordance with one or more embodiments.

Referring to FIG. 1, a block diagram of an illustrative data store system 100 is depicted in accordance with one or more embodiments of the present invention. The illustrative data store system 100 may be utilized by network-based services (service providers) 104, such as network-based purchasing services that facilitate purchase transactions over a communication network (such as the Internet) or any network-based services that access/manage customer data. The data store system 100 may include one or more partitions each of which is a logical division of a data store, configured to manage and store a group of entities. In one embodiment, each partition 122, 124 may store an exclusive set of entities so that there is no overlap of entities between partitions. Also, an entity, an indivisible unit of data related to a customer, may be stored in its entirety in one partition. Each entity may be maintained such a way that the size of a single entity remains small compared to the partition size at any time. As will be appreciated by one of skilled in the art, a partition may be physically separate hardware in the data store or a logically distinct portion of the data store that functions as though it were a physically separate unit. The data store system 100 includes the global data store 110 where an entity-partition table is stored. The entity-partition table is referenced to find a relationship between an entity and a corresponding partition. In one embodiment, the entity-partition table may be stored in local memory such as cache memory for faster access.

The data store system 100 may also comprise a data store management component 106 for communicating with a partition when there is a need to access data stored in the partition 122, 124. The data store management component 106 may be configured to detect an event to migrate entities to new partitions. As will be discussed in greater detail below, such an event may be triggered when an existing partition reaches a threshold capacity to handle data transactions, to store additional data, etc. In addition, such an event may be triggered for partition capacity planning purposes. That is, the sever may predict that a particular partition may need to be bifurcated in the future based on data access patterns on an entity associated with the particular partition. Upon detection of the event, a new partition may be added into the data store system to allow some entities to migrate into the new partition.

In one embodiment, a partition may include a partition management application 108 that is responsible for managing and accessing its corresponding partitions 122, 124. When a service provider receives a request to access an entity, the data store management component 106 may communicate with the global data store 110 to identify a partition where the entity resides. Subsequently, the data store management component 106 may forward, redirect, or provide the received request to the identified partition (or the partition management application). The identified partition may access the entity to service the request and provide a response to the request. The data store management component 106 receives the response to the request from the identified partition. In another embodiment, the partition management application 108 may also be responsible for managing partitioning logic across partitions 122, 124.

Figure 2:
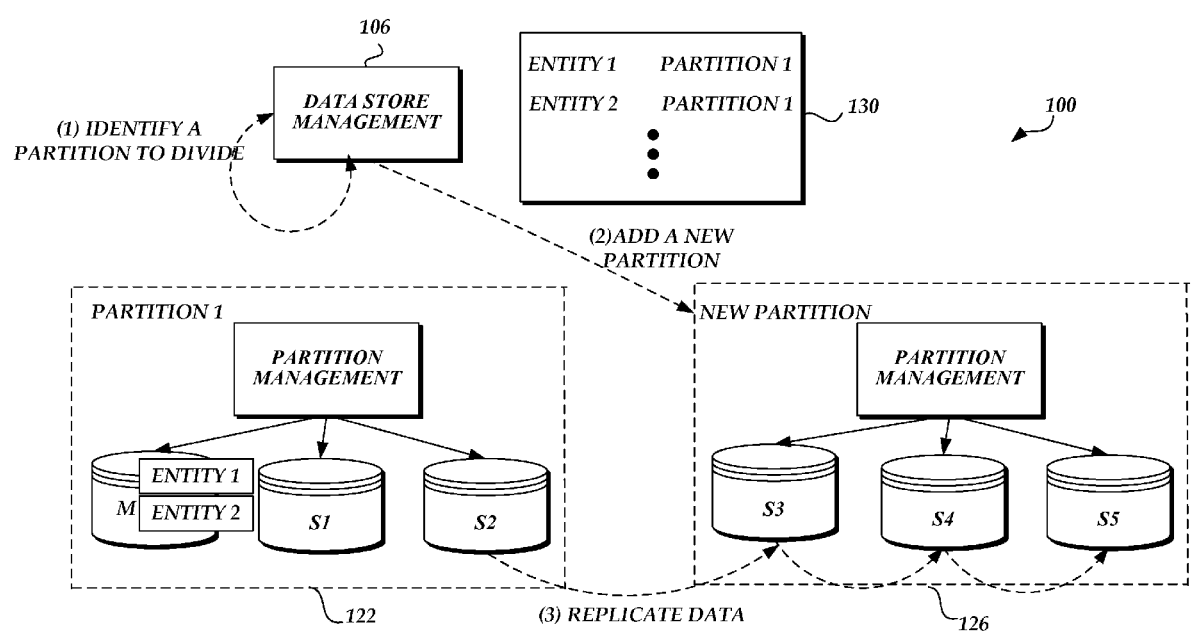
FIGS. 2-3 are block diagrams depicting interactions of various components in a data store system illustrating the redistribution of entities from a partition to new partitions upon detecting a new partition event, in accordance with one or more embodiments.
Figure 3:
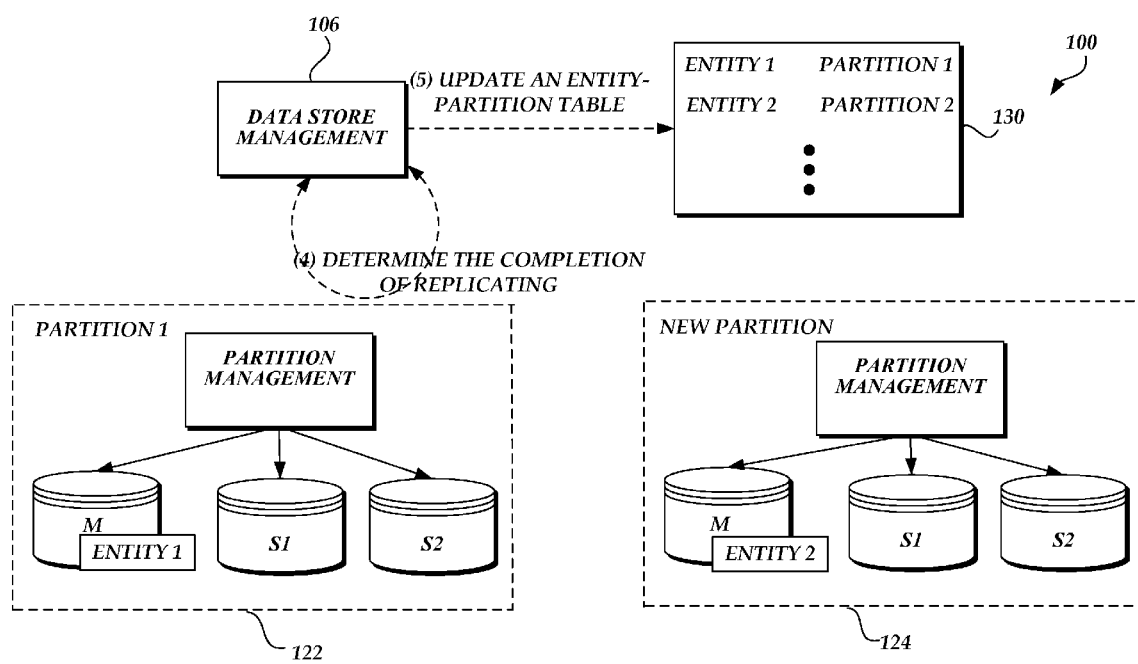

FIGS. 2-3 are block diagrams depicting interactions of various components in the illustrative data store system 100 when a group of entities are migrated from a partition to new partitions upon detecting a new-partition event. For the purposes of discussion, illustrative embodiments described herein are discussed in conjunction with partitions comprising multiple host databases of which one is designated the master host. The remaining host databases in the partition are slave hosts to the master host. Further, each partition in the data store system may have an identical configuration to simplify replication/migration processes. Although specific partition configurations are illustrated, it should be understood that the illustrative embodiments provided are used only for ease in discussion and should not be construed as limiting.

Referring now to FIG. 2, a block diagram depicts interactions of various components in the illustrative data store system 100 when a data store management component 106 detects an event (hereinafter a "new-partition event") to divide a partition into multiple partitions. The data store management component 106 may identify a first partition 122 that reaches a threshold capacity, to handle data access transactions. The threshold capacity, including, but not limited to, a threshold value for a hardware capacity (memory resource), a threshold value for processing capacity, a threshold value for incoming traffic, etc., in a particular partition may be predefined to trigger a new-partition event.

As shown, the first partition 122 is associated with a group of entities, for example, "Entity 1" and "Entity 2." The data store system may include an entity-partition table 130 that reflects the relationship between a partition and entity, such as the relationship between the first partition 122, "Entity 1" and "Entity 2." Upon detecting a new-partition event, the data store management component 106 adds a new partition 126 into the data store system to ease the load of the first partition 122. As will be understood by one of ordinary skill in the art, when a new partition is added, new database hardware and applications to manage the new partition may be deployed to make the new partition ready for a data migration. Subsequently, the data in the first partition 122 are replicated to the new partition 126.

In one embodiment, each partition in the data store system 100 may comprise a master host and several slave hosts, wherein the master host is configured to receive a request for access to an entity from the partitioning management application. In one embodiment, data replication within a particular partition starts from the master host to a first slave host. Then, from the first slave host to a second slave, and so on. In another embodiment, the master host may concurrently or asynchronously replicate data to slave hosts within a particular partition. If the master host in the particular partition receives a request to update data in an entity, the master host replicates the updated data to the remaining slave hosts in order to maintain data integrity and consistency. Also, if the master host is not correctly operating or down, one of the slave hosts may be selected and designated as a new master host. Since the slave hosts and the master host maintain exact duplicates of entities, any slave host can play the role of master host in any event. Using this internal replication mechanism where the data is replicated with the update, entity migration across partitions can be achieved with mitigated disturbance in terms of data availability.

Initially, the new partition 126 may be configured to include new slave hosts that are treated as a secondary slave hosts to the slave hosts of the first partition 122. For example, the first partition 122 is composed of a master host and a set of two slave hosts, such as S1 and S2 as depicted in FIG. 2. If the service provider detects that the first partition 122 needs to bifurcate, a new partition 126 is added into the data store system for an entity migration. As shown in FIG. 2, the new partition initially starts with three slave hosts, such as S3, S4, and S5. The three slave hosts are added as secondary slave hosts to the slave hosts in the first partition 122. The last slave host S2 may replicate the stored entities into S3 that in return may replicate the entities to S4. S4 may replicate the entities into S5. Before the replication is fully completed, all requests to access the set of entities associated with the first partition 122 may be provided to and served by the first partition 122. In this manner, any update request can be served by the first partition and replicated in accord with an internal replication mechanism. The master host in the first partition 122 may replicate the updated data to the remaining slave hosts within the first partition 122 and the new slave hosts in the new partition 126, preferably in order. In an aspect of an embodiment, minimal locking may be required for a write/update request in the first partition 122 during the replication process. In that event, the master host replicates the updated data to the remaining slave hosts that in turn replicate the updated data to the new slave hosts. In alternative embodiment, the master host in the first partition 122 may asynchronously replicate the updated data to the slave hosts within the first partition 122 and the new slave hosts in the new partition 126.

As shown in FIG. 3, the data management component determines whether the replication is completed after the replication process. For example, the data management component 106 may determine whether the first partition and the new partition have identical copies of data. Further, the data management component 106 may check whether any write/update transaction has been issued in the partition since the replication started. If there is any write/update transaction issued, the master host of the first partition replicates the updated data until each slave host has identical copies of data. Upon determining that the replication has been completed, a set of entities associated with the first partition 122 may be divided into two groups.

In one embodiment, the set of entities may be manually divided in a manner that leaves each resulting partition load-balanced. The size, activity, and data traffic of customers are considered when the set of entities are divided. In another embodiment, the set of entities may be automatically divided based on a set of rules. A group of entities may be selected for migration to the new partition 126. Subsequently, the entity-partition table may be updated to reflect that the selected subset of entities are now associated with the new partition 126. One of the slave hosts in the new partition 126 is selected to be a designated master host for the new partition 126. With the new master host, the new partition 126 is ready to handle data transactions accessing the selected subset of entities. At the end of the migration process, the first partition may delete the selected subset of entities that are now associated with the new partition. Likewise, the new partition may delete the entities that are associated with the first partition. The data traffic accessing the selected subset of entities may be provided to the new partition and the data traffic accessing the remaining entities in the first partition 122 may be provided to the first partition 122.

Continuing with the example mentioned above in FIG. 2, after the replication process is completed, the new partition 126 comprises one master and two slave hosts, such as 51 and S2. A group of entities, such as "Entity 2," are selected to migrate to the new partition 126. As shown, the entity-partition table 130 is updated to reflect the fact that "Entity 1" lives in the first partition 122 and "Entity 2" lives the new partition 126. That is, data traffic to access "Entity 1" will be provided to the first partition 122 and data traffic to access "Entity 2" will be provided to the new partition 126. The first partition may delete "Entity 2" from the master and slave hosts and the new partition may delete "Entity 1" from the master and slave hosts.

As will be appreciated, a partition may comprise any combination of master and slave hosts in accordance with the underlying structure of the data store system 100. Further, it is contemplate that the data store management component and the service provider may be merged into one service component that receives data access requests from customers, manages a data store system and is responsible for managing partitioning logic across partitions.

Figure 4:
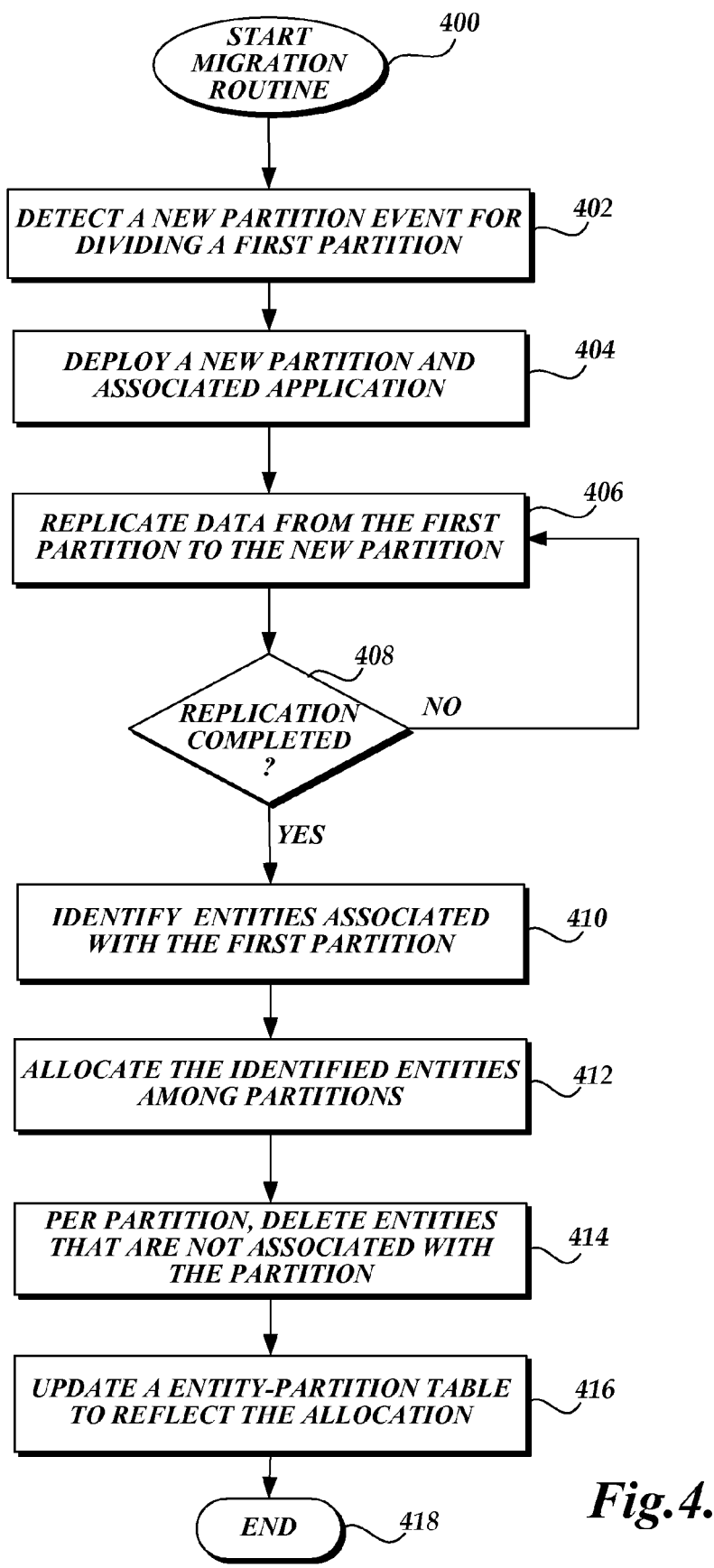
FIG. 4 is a flow diagram of an illustrative data migration routine for migrating data entities from a first partition to new partitions, in accordance with one or more embodiments.

Referring to FIG. 4, a flow diagram depicts an illustrative migration routine 400 for migrating entities from a first partition to new partitions without compromising data availability of the entities. As with FIGS. 2 and 3, assume that a customer in the service provider is represented as an indivisible entity, a collection of customer data that resides in a dedicated partition. In addition, the service provider maintains a data store system that comprises a plurality of partitions, each of which is associated with an exclusive set of entities. For the sake of discussion, hereinafter, a first partition refers to a partition that already exists in the data store system and a new partition refers to a partition that is added to the data store system.

Beginning with block 402, a new-partition event that indicates a need to bifurcate a first partition is detected. As discussed above, the new-partition event may be triggered when the first partition reaches a threshold capacity. In addition, the new-partition event may be triggered when an entity in the first partition reaches an entity threshold. The service provider may have defined a threshold limit for an entity (an entity threshold) that is a threshold size of an entity or a threshold amount of traffic within a single entity to initiate a "bulk migration." A "bulk migration," as used herein, refers to a data migration implemented per entity based from one partition to another. Since an entity is assigned to only one partition as an indivisible collection of customer data, data migration between a first collection and a new partition may be implemented per entity. As described above, the service provider may have defined a threshold limit for a partition (a threshold capacity) that is a threshold size of stored entities or a threshold amount of traffic within a partition. In one embodiment, each entity may include customer profile information that includes a data growth and data access activity rate in an associated partition. Such rates can be utilized to determine an entity that may potentially trigger another new-partition event to bifurcate an associated partition in the near future. If another new-partition event seems imminent, the service provider may add an additional partition to accommodate the rapidly growing entity. The service provider may be able to proactively migrate entities amongst partitions.

At block 404, a new partition and an associated application may be deployed and made ready for replication of the first partition. In one embodiment, when a new partition is initialized, the new partition may comprise N numbers of slave hosts that are initialized to depend on the master host in the first partition. At block 406, data are replicated from the first partition to the new partition. In one embodiment, during the replication phase, the new partition may be treated as a group of additional slave hosts to the first partition. Thus, when the new partition is initialized, the first partition may double in size. Further, the replication of data from the first partition to the new partition can be implemented as if the master host replicates data to its internal slave host in order of dependency among slave hosts. In another embodiment, the master hosts asynchronously replicates data to the slave hosts. This configuration increases performance for each partition, but decreases consistency between the resulting bifurcated partitions.

At decision block 408, a determination is made as to whether the replication of data from the first partition to the new partition has been completed. The service provider may conclude that the replication is complete if the first partition and the new partition each have an identical copy of the entities. During the replication process, any activity, including a data updating activity is allowed in the first partition so that data availability in the entities is not compromised. In this manner, any disruptions to various network services that require immediate access to the data may be minimized during the replication/migration process. In addition, data updates may be monitored to ensure data consistency among partitions. That is, if there are any updates in the first partition during the replication process, there is a good chance that the first partition and the new partition may not have an identical copy of information (entities). Thus, in order to make sure that the replication of the data from the first partition to the new partition is completed, the service provider may check whether there was any write/update activity performed in the first partition after the replication process began.

If it is determined at decision block 408 that replication is not completed, the routine returns to block 406 where the first partition is replicated into the new partition. For example, any updates made during the replication process are replicated from the master host to the slave hosts. If it is determined that the replication is completed, at block 410, the service provider identifies entities associated with the first partition. In one embodiment, the service provider may consult with a global database where an entity table is located. The entity table represents which entity resides in which partition.

At block 412, the identified entities may be allocated amongst partitions. As mentioned above, the identified entities may be manually distributed to achieve good load-balance among the partitions. The current and potential size and activity of customers may be considered when the identified entities are being divided. In one embodiment, each entity may include customer profile information that includes a data growth and data access activity rate in an associated partition. Such rates can be utilized to determine an entity that may potentially trigger another new-partition event to bifurcate an associated partition in the near future. If another new-partition event seems imminent, the service provider may add an additional partition to accommodate the rapidly growing entity. The service provider may be able to proactively migrate entities amongst partitions.

At block 414, each partition may delete entities that are allocated to other partitions so that only the entities allocated to the partition can remain within. At block 416, the entity-partition table may be updated to reflect the allocation of the entities. For example, the first partition is associated with a selection of the identified entities and the new partition is associated with the remaining identified entities. The routine 400 completes at block 418.

Figure 5:
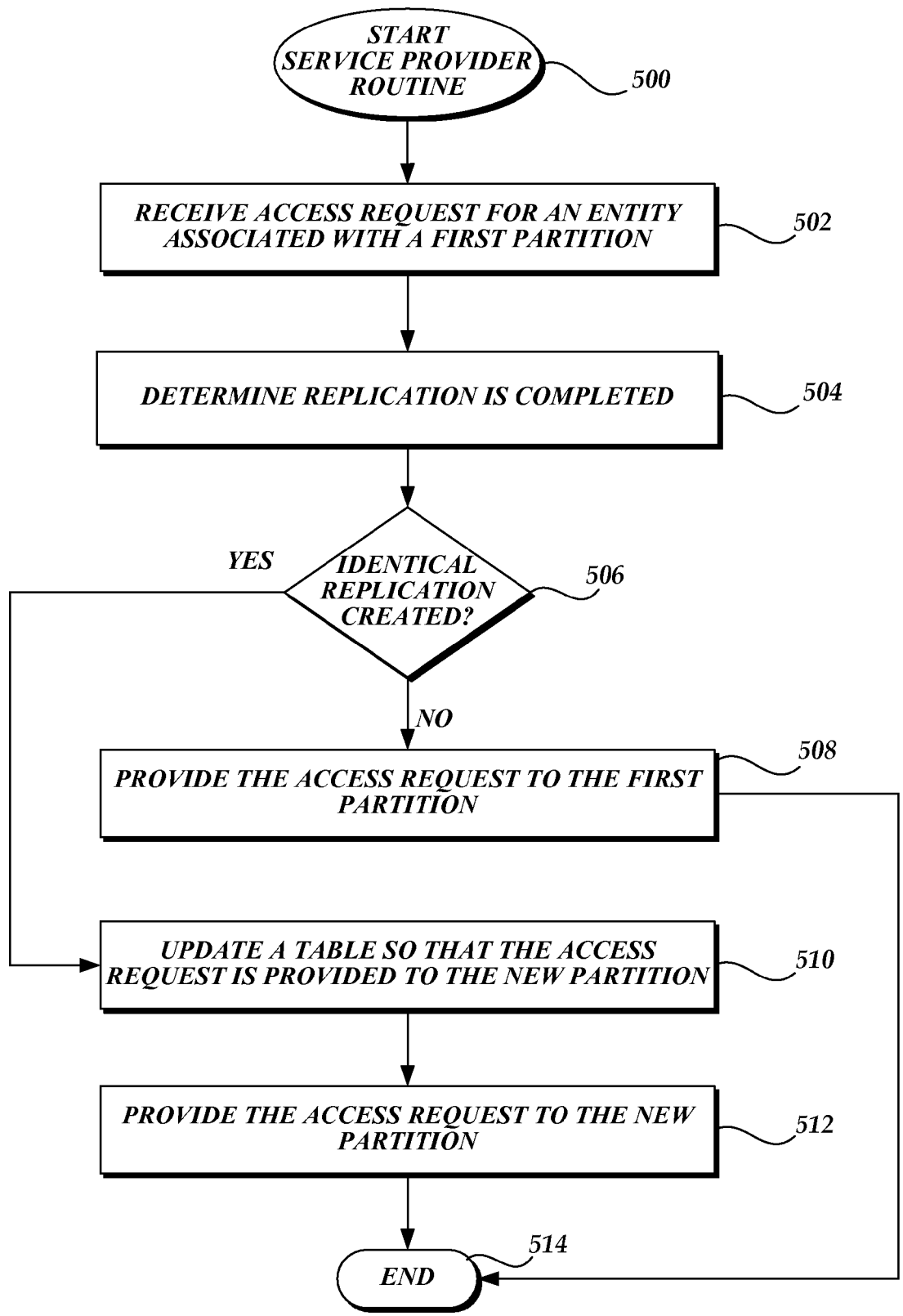
FIG. 5 is a flow diagram of an illustrative service provider routine for providing data traffic to a partition responsible for handling such data traffic during the data migration routine.

Referring to FIG. 5, a flow diagram depicts an illustrative service provider routine 500 to provide data traffic accessing an entity to a partition that is responsible for managing that entity. For the purpose of discussion, assume that a first partition has reached a threshold capacity, which has triggered a new-partition event. An entity migration in the data store system has begun and subsequently, one or more new partitions are added in the data store system. As with FIG. 4, assume further that the new partitions are deployed as a series of slave hosts to the first partition. Although any conventional data replication is suitable for the data store system, the embodiments illustrated herein will be described in conjunction with a concurrent replication, where a master host replicates information concurrently to other slave hosts. As will be appreciated by ordinary skill in the art, the illustrative embodiments provided are used only for ease in discussion and should not be construed as limiting. During the replication process, the data store system may allow any type of data access request, including an update request, for an entity that may be migrating from the first partition to a new partition.

At block 502, the service provider may receive an access request for an entity that is currently associated with a first partition but has been selected to allocate to a new partition. At block 504, the service provider may determine whether the replication process is completed amongst partitions. For example, the service provider may determine whether any write/update activity has been performed in the first partition since the replication has started. At decision block 506, it is determined whether an identical replication of the first partition has been created in all new partitions.

As mentioned above, if any write/update activity has been performed in the first partition since the replication began, each partition may not have an identical copy of data. If it is determined that the replication is not complete, at block 508, the service provider may provide the access request to the first partition. If it is determined that the replication is complete, at block 510, the service provider may update an entity-partition table so that the access request is provided to the new partition where the entity has been allocated.

In one embodiment, while updating the entity-partition table, the service provider may lock the first partition denying any updates on the entities which are to be associated with the new partitions. In this manner, any inconsistency amongst partitions can be prevented while the time period of locking is minimized. If it is determined that the replication is not completed, the service provider provides the access request to the first partition at block 512. After the access request is provided to the appropriate partition, the routine 500 completes at block 514.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for managing a plurality of partitions, wherein each partition includes at least one entity, the computer-implemented method comprising:
    detecting an event that indicates a need to migrate data from a first partition, wherein the event is detected utilizing a rate of data growth of at least one entity stored in the first partition;
    in response to detecting the event, deploying at least one new partition and an associated application to manage the new partition;
    replicating data from the first partition to the new partition; and
    in response to completion of replicating the data from the first partition to the new partition:
        identifying entities associated with the first partition; and
        allocating the identified entities among the first partition and the new partition,
    wherein each entity is a collection of data related to a customer, the collection of data being indivisible between the first partition and the new partition such that transactions requiring data related to the customer are handled within the partition where the entity is allocated.

2. The computer-implemented method of claim 1, wherein when there is any update in the first partition during replicating, the update is replicated from the first partition to the new partition.

3. The computer-implemented method of claim 1, wherein the event that indicates a need to migrate data from a first partition is triggered when an entity stored in the first partition reaches an entity threshold.

4. The computer-implemented method of claim 3, wherein the entity threshold is a threshold size of information regarding the entity stored in the first partition.

5. The computer-implemented method of claim 3, wherein the entity threshold is a threshold amount of data traffic accessing the entity stored in the first partition.

6. The computer-implemented method of claim 1, further comprising updating an entity-partition table to reflect new entity allocation among partitions.

7. The computer-implemented method of claim 6, wherein the entity-partition table represents a relationship between an entity and a partition.

8. The computer-implemented method of claim 1, wherein allocating the identified entities includes load balancing among the first partition and the new partition.

9. The computer-implemented method of claim 1, wherein allocating the identified entities includes dividing the identified entities into a first group and a second group.

10. The computer-implemented method of claim 9, wherein the first group is associated with the first partition and the second group is associated with the new partition.

11. The computer-implemented method of claim 10, wherein, in response to completion of replicating, entities in the second group are deleted from the first partition and entities in the first group are deleted from the new partition.

12. The computer-implemented method of claim 1, wherein determining if replicating data from the first partition to the new partition is completed includes determining if the first partition and the new partition have identical copies of information about the entities.

13. The computer-implemented method of claim 1, wherein each entity stored in a partition is defined by an entity identifier.

14. The computer-implemented method of claim 1, wherein the first partition includes a master host and a plurality of slave hosts.

15. The computer-implemented method of claim 14, wherein the new partition is added as a plurality of slave hosts to the first partition.

16. The computer-implemented method of claim 15, wherein after the replication is completed, one of the plurality of slave hosts in the new partition is designated to be the master host for the new partition.

17. The computer-implemented method of claim 1, wherein each entity in a partition corresponds to a customer with which all actions associated are handled by the partition.

18. The computer-implemented method of claim 1, wherein the indivisible collection of data is related to a particular customer.

19. A computer system for adding an additional partition to a data store system to provide scalability in the data store system wherein the data store system includes a plurality of partitions, each of which contains information related to entities, the computer system comprising:
one or more data stores containing a plurality of partitions, each of which stores a set of entities, wherein an entity-partition table reflecting a relationship between a partition and an entity is stored in the one or more data stores, and wherein each entity is a collection of data related to a customer, the collection of data being indivisible among the plurality of partitions such that transactions requiring data related to the customer are handled within the partition storing the entity; and
a computing device in communication with the one or more data stores, wherein the computing device is configured to:
detect an event that indicates a need to add an additional partition to the one or more data stores, wherein the event is detected utilizing a rate of data growth of at least one of the entities in a partition; and
in response to detecting an event that indicates a need to add an additional partition:
identify a first partition which is to be divided and identify a set of entities associated with the first partition;
add an additional partition to the one or more data stores;
replicate data from the first partition to the additional partition, wherein when there is any update in the first partition during replicating, the update is replicated from the first partition to the additional partition; and
in response to completion of replication of the data from the first partition to the additional portion, allocate the identified set of entities between the first partition and the additional partition.

20. The computer system of claim 19, wherein the identified set of entities are allocated so that the amount of data traffic accessing the identified set of entities is balanced between the first partition and the additional partition.

21. The computer system of claim 19, wherein the identified set of entities are allocated so that the total data related to entities in the first group is balanced with the total data related to entities in the second group.

22. The computer system of claim 19, wherein the event that indicates a need to add an additional partition is detected when the first partition reaches a threshold capacity.

23. The computer system of claim 22, wherein the threshold capacity is a defined threshold amount of information related to the entities stored in the first partition.

24. The computer system of claim 22, wherein the threshold capacity is a defined threshold amount of data traffic to access the first partition.

25. The computer system of claim 19, wherein after allocating the identified set of entities between the first partition and the additional partition, entities allocated to the first partition are deleted from the additional partition and entities allocated to the additional partition are deleted from the first partition.

26. The computer system of claim 19, wherein the entity-partition table is updated to reflect the entity allocation among the first partition and the additional partition.

27. The computer system of claim 19, wherein a plurality of additional partitions is added to the one or more data stores.

28. The computer system of claim 27, wherein the identified entities are allocated among the first partition and the plurality of additional partitions.

29. The computer system of claim 19, wherein each entity is an indivisible collection of data related to a particular customer.

30. A non-transitory computer-readable medium having computer-executable components stored thereon that, in response to execution by a computing device, cause the computing device to replicate a first partition into a second partition without disturbing user access to entities associated with the first partition, the computer-executable components comprising:
a data store managing component for:
detecting when the first partition reaches a threshold capacity based at least in part on a rate of data growth of an entity in the first partition; and
in response to detecting that the first partition has reached the threshold capacity:
identifying entities associated with the first partition;
selecting a set of entities to be migrated from the first partition, the set of entities being selected from the identified entities;
adding a second partition; and
replicating data from the first partition to the second partition; and
a table component for storing information regarding a relationship between an entity and a partition;
wherein, in response to completing the replicating of the data from the first partition to the second partition, the table component is updated to reflect a relationship of the selected set of entities and the second partition,
wherein each entity is a collection of data related to a customer, the collection of data being indivisible between the first partition and the second partition such that transactions requiring data related to the customer are handled within the partition where the entity is stored.

31. The non-transitory computer-readable medium of claim 30, wherein the first partition includes a master host and a plurality of slave hosts.

32. The non-transitory computer-readable medium of claim 30, wherein the second partition is added as a plurality of slave hosts to file first partition.

33. The non-transitory computer-readable medium of claim 32, wherein after the replication is completed, one of the plurality of slave hosts in the second partition is designated to be the master host for the second partition.

34. The non-transitory computer-readable medium of claim 30, wherein the collection of data is indivisible between the first partition and the second partition such that all transactions requiring data related to the customer are handled within the partition where the entity is stored.

35. The computer-implemented method of claim 1, wherein the collection of data is indivisible between the first partition and the new partition such that all transactions requiring data related to the customer are handled within the partition where the entity is allocated.

36. The computer system of claim 19, wherein the collection of data is indivisible among the plurality of partitions such that all transactions requiring data related to the customer are handled within the partition storing the entity.

* * * * *

UNITED STATES PATENT AND TRADEMARK OFFICE
CERTIFICATE OF CORRECTION

| | | |
|---|---|---|
| PATENT NO. | : 7,788,233 B1 | |
| APPLICATION NO. | : 11/773589 | |
| DATED | : August 31, 2010 | |
| INVENTOR(S) | : V. Iyer et al. | |

It is certified that error appears in the above-identified patent and that said Letters Patent is hereby corrected as shown below:

| COLUMN | LINE | ERROR |
|---|---|---|
| 9 | 40 | "identity" should read --identify-- |
| (Claim 19, | line 24) | |
| | | |
| 10 | 55 | "file" should read --the-- |
| (Claim 32, | line 3) | |

Signed and Sealed this
Fifteenth Day of February, 2011

David J. Kappos
*Director of the United States Patent and Trademark Office*